(12) United States Patent
Crouse

(10) Patent No.: US 7,644,962 B2
(45) Date of Patent: Jan. 12, 2010

(54) UNIVERSAL ATTACHMENT FLANGE

(75) Inventor: Andrew Christian Crouse, Woodridge, IL (US)

(73) Assignee: Salco Products Inc., Lemont, IL (US)

( * ) Notice: Subject to any disclaimer, the term of this patent is extended or adjusted under 35 U.S.C. 154(b) by 576 days.

(21) Appl. No.: 11/361,777

(22) Filed: Feb. 23, 2006

(65) Prior Publication Data

US 2007/0194570 A1    Aug. 23, 2007

(51) Int. Cl.
*F16L 23/00* (2006.01)

(52) U.S. Cl. .................. 285/412; 285/405; 403/337

(58) Field of Classification Search ............ 285/363, 285/368, 405, 412; 403/335, 336, 337
See application file for complete search history.

(56) References Cited

U.S. PATENT DOCUMENTS

| | | | | |
|---|---|---|---|---|
| 2,859,052 A | * | 11/1958 | Corbeels et al. | 285/18 |
| 3,650,550 A | * | 3/1972 | West | 285/55 |
| 3,781,043 A | * | 12/1973 | Hagmann | 285/363 |
| 4,180,024 A | * | 12/1979 | Hernandez | 123/41.46 |
| 4,183,562 A | * | 1/1980 | Watkins et al. | 285/405 |
| 4,204,589 A | * | 5/1980 | Loker et al. | 192/27 |
| 4,394,562 A | * | 7/1983 | Epstein et al. | 392/489 |
| 5,022,310 A | * | 6/1991 | Stewart et al. | 91/501 |
| 5,076,982 A | * | 12/1991 | Holzl et al. | 264/81 |
| 5,437,482 A | * | 8/1995 | Curtis | 285/148.13 |
| 5,645,363 A | * | 7/1997 | Dafforn et al. | 403/3 |
| 5,947,528 A | * | 9/1999 | Campbell | 285/16 |
| 6,095,293 A | * | 8/2000 | Brundrett et al. | 188/72.1 |
| 6,514,147 B2 | * | 2/2003 | Aoki et al. | 464/98 |
| 6,685,570 B2 | * | 2/2004 | Zilberman et al. | 464/94 |
| 6,769,312 B2 | * | 8/2004 | Meyer et al. | 73/862.042 |
| 6,957,832 B1 | * | 10/2005 | Pannekoek | 285/184 |
| 2007/0169828 A1 | * | 7/2007 | Orleskie et al. | 138/94 |

FOREIGN PATENT DOCUMENTS

WO        WO 9313346 A1   *   7/1993

* cited by examiner

*Primary Examiner*—James M Hewitt
(74) *Attorney, Agent, or Firm*—Leydig, Voit & Mayer Ltd.

(57) ABSTRACT

A universal attachment flange to connect equipment utilized to perform a task to various connection arrangements. A universal attachment flange is provided with a plurality of hole patterns to permit a bolted attachment of the flange to other devices that present varying patterns of bolt receiving holes. The universal attachment flange is capable of connection to a variety of four (4) hole patterns and at least one three (3) hole pattern. In one form the universal attachment flange includes a through hole threaded to receive a connection fitting.

14 Claims, 3 Drawing Sheets

UNIVERSAL ATTACHMENT FLANGE

BACKGROUND OF THE INVENTION

This invention relates to an attachment flange for equipment utilized to perform a task by connection to other equipment. More particularly, it is directed to an attachment flange primarily to attach associated equipment to a variety of connection arrangements.

In many industries, equipment used to perform a task must accommodate a variety of connection arrangements present on the equipment upon which a particular activity is to be performed. One such example is found in the railroad and trucking industries in which pressurized air or other source of pressurized gas is attached to a tank car or a vehicular tank trailer to deliver the pressurized gas into the interior of the tank car or tank trailer during unloading of the load carried in the vehicle. The tank cars or trailer tanks of various manufacturers are used by shippers to supply raw materials to a customer that uses the materials in a manufacturing process. Because of differences between manufacturers of the load carrying vehicles, the task of unloading requires a variety of attachment arrangements to accommodate the connection arrangements presented by the vehicles employed by shippers.

The present invention accommodates the variance in connection arrangements by providing an attachment flange for the equipment to be connected that has a universal attachment capability.

DETAILED DESCRIPTION

Figure 1:
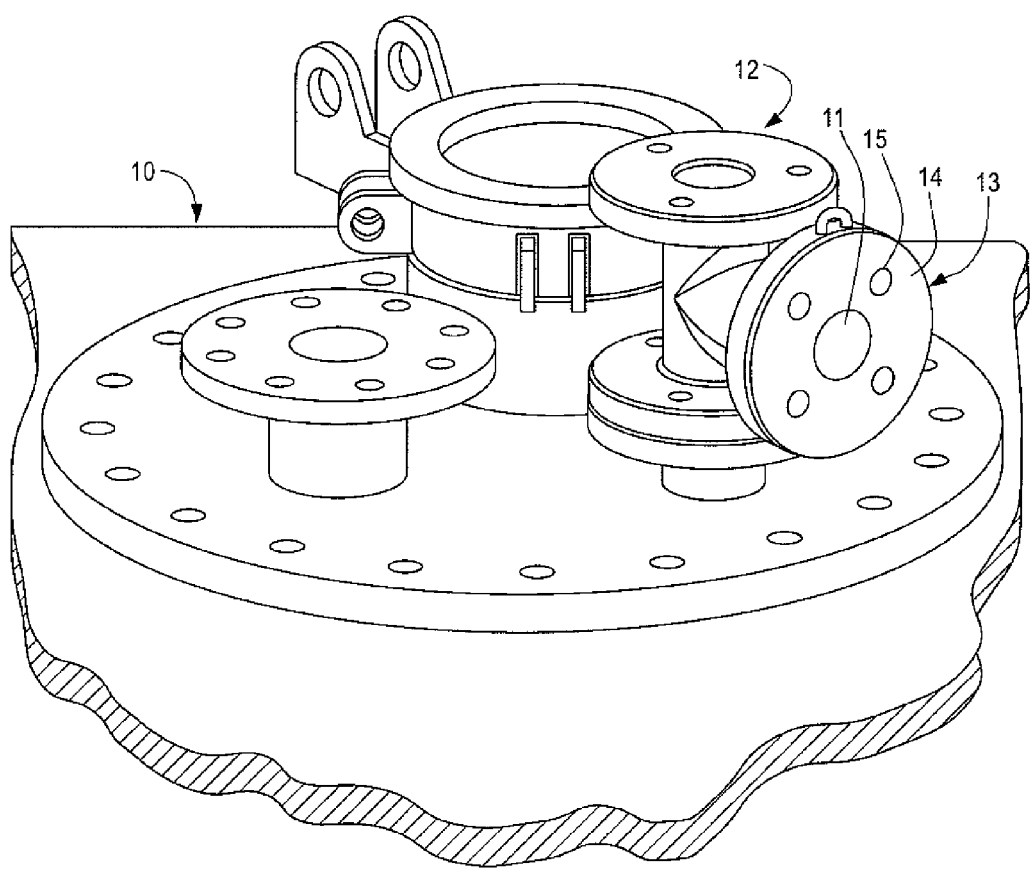
FIG. 1 is a fragmentary perspective view of a connection arrangement illustrative of one embodiment of a railroad tank car or vehicular trailer tank with connection arrangement in the form of a flange for attachment of a supply of pressurized air or other gas.

Turning now to the drawings, FIG. 1 shows load carrying equipment in the form of a vehicular tank car 10. The car 10 includes a connection station 12 for connection of various lines to input air to assist in unloading of the contents of the car.

One connection 13 in the form of an annular flange surrounding an opening 11 receives input from a pressurized air from a supply at the unloading station. The air is discharged into the tank through associated piping to assist in unloading of the lading which is usually a fluent, particulate material. Air enters opening 11 and passes through a system of pipes (not shown) inside the tank.

Connection 13 is an annular flange with a generally planar attachment face 14. A plurality of circular, or round holes 15 receive bolts to connect the source of pressurized air to the connection flange 13. Because the tank cars are made by different manufacturers the bolt pattern presented by one connection for attachment of the air supply line are different from the bolt pattern presented by a car of a different manufacturer. In the embodiment illustrated, the bolt receiving holes 15 of the flange or connection 13 are disposed ninety degrees (90°) apart on a 5½ inch diameter bolt circle. The holes are sized to receive a standard ⅝ inch bolt. The term bolt circle is the common term for an imaginary circular line passing through the centers of the bolt receiving holes 15 coaxial with the transverse axis perpendicular to planar attachment face 14.

Common bolting patterns presented by connection flange 13 include four (4) holes on a six inch diameter (6") bolt circle, four (4) holes on a five and one half inch (5½") diameter bolt circle, four (4) holes on a four and three quarter inch (4¾") diameter bolt circle and three (3) holes on a five and one half inch (5½") diameter bolt circle. The holes of the four hole patterns are ninety degrees (90°) apart and the holes of the three hole pattern are one hundred twenty degrees (120°) apart.

In accordance with the present invention, a universal attachment flange 16 is provided which accommodates various different patterns of annular hole spacing arrangements of connection flange 13. The flange 16 as illustrated has a generally annular body with concentric radially inner and radially outer edges coaxial with a transverse centerline perpendicular to a front generally planar face surface 19, and a rear generally planar face surface 21. The shape of the exterior perimeter of flange 16, or its axial thickness is not material to the present invention. It must only be of a shape and thickness to permit securement to the connection flange 13 on the tank car without leakage between facing surfaces.

In the illustrated embodiment the axial thickness is two inches (2"). The flange 16 could also be made of metal. Preferably the universal attachment flange 16 is made of a polymer such as polyethylene.

As illustrated, the universal attachment flange 16 includes a central through hole 18 threaded with a pipe thread that commences at front generally planar face surface 19. It receives a connection fitting of a hose from an external source of pressurized air. Typically the air hose is connected to the pressurized air supply at the unloading location. The air is usually passed through a regulator and delivered at a pressure of from 10 to 15 pounds per square inch gauge (PSIG).

The hose connection hole 18 illustrated is a one inch (1") national pipe thread (NPT) fitting, with eleven and one-half (11½) threads per inch, but the size and can vary without departing from the present invention. It must be understood that the present invention contemplates that the attachment flange 16 not include through hole 18. The flange, in that instance, can be utilized as a closure, to seal off opening 11 in connection flange 13.

The rear generally planar face 21 of universal attachment flange 16 mates with the planar face 14 of connection flange 13 in face-to-face relation. Flange 16 includes a series of through holes in a pattern, generally designated 20, through which bolts (not shown) can be passed. Nuts (not shown) attached to bolts secure the flange 16 to the connection flange 13. A gasket (not shown) may be employed between the generally planar face 14 of connection flange 13 and rear generally planar face surface 21 of universal attachment flange 16 to insure against leakage.

The hole pattern 20 is a combination of elongated or oblong holes 22 and circular holes 30 and oblong holes 32 that align with and overlie a variety of patterns on the connection flange 13 of different tank cars or tank trailers to permit attachment of flange 16 to connection flange 13.

For simplicity, the term "bolt circle" is used in this application to refer to the concentric imaginary circular lines upon which a radius is struck to define a curved surface defining at least a portion of a through hole of the hole pattern 20 of the universal attachment flange 16.

These imaginary lines are illustrated as concentric with the radially inner and radially outer edges of generally planar face surfaces 19 and 21 about a transverse centerline perpendicular to the generally planar surfaces 19 and 21. Of course, the edge shape of universal attachment flange 16 could vary without departing from the invention. Also, the central hole 18 need not be present.

The embodiments illustrated are intended to provide an understanding of the configuration of hole patterns of the invention. Note also that the reference to horizontal and vertical is, also only for ease in understanding since the universal attachment flange 16 is capable of being positioned in any plane. Also, the horizontal and vertical centerlines are imaginary lines that intersect each other to define four imaginary radial lines that are ninety degrees (90°) apart.

As described below, the hole patterns are formed by a radius designated "R" struck from locations on three concentric bolt circles designated $BC_1$, $BC_2$, and $BC_3$. The radially outer bolt circle $BC_1$ has a six inch (6") diameter, the middle bolt circle $BC_2$ has a five and one half inch (5½") diameter and the radially inner bolt circle $BC_3$ has a four and three quarter inch (4¾") diameter.

The radius R defining the holes is a three-eights inch (⅜") radius. Thus, the round holes are three quarter inch (¾") in diameter (twice R) and the oblong or elongated holes have a width of three quarter inch (¾") and have semi-circular ends formed on a three-eights inch (⅜") radius (R). This hole size provides adequate clearance for the ⅝" bolts used to connect universal attachment flange 16 to connection flange 13.

Figure 2:
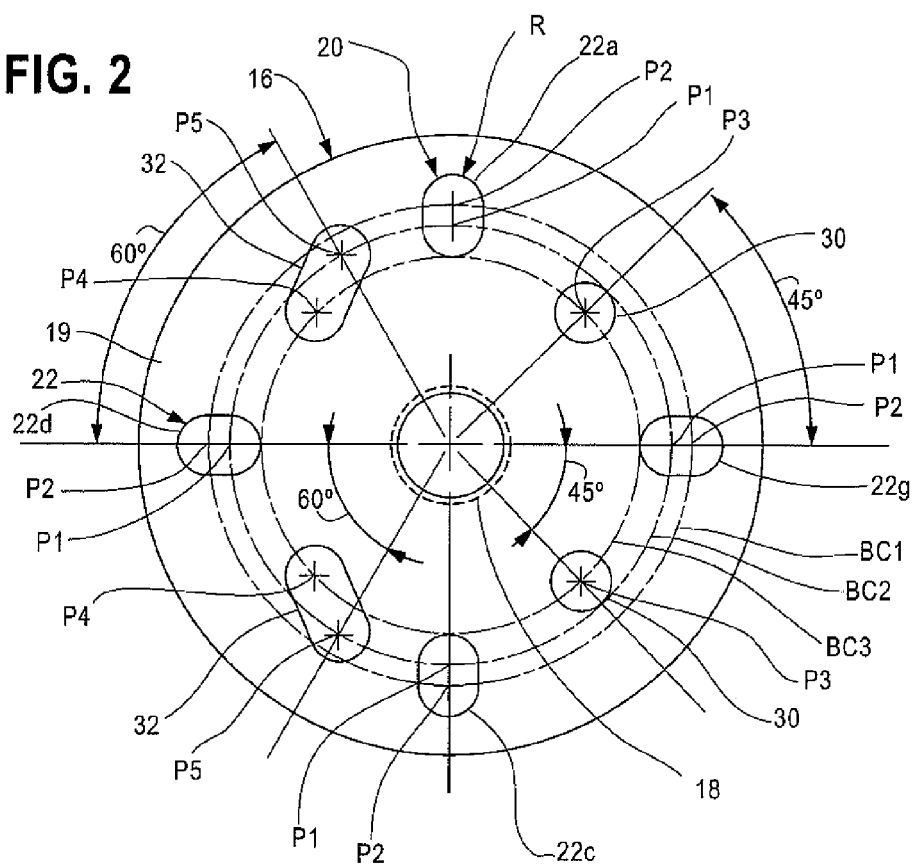
FIG. 2 is a front planar view of one embodiment of the universal attachment flange of the present invention.
Figure 3:
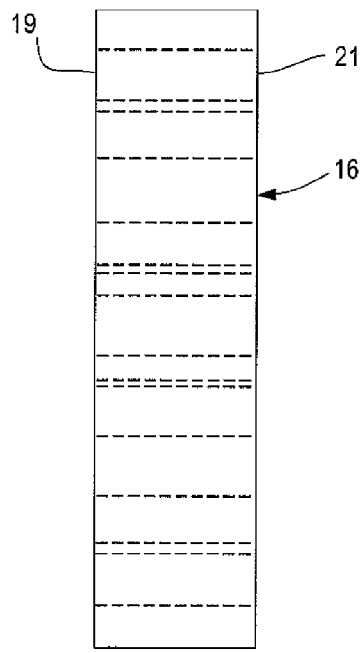
FIG. 3 is a side view of the flange of FIG. 2.
Figure 4:
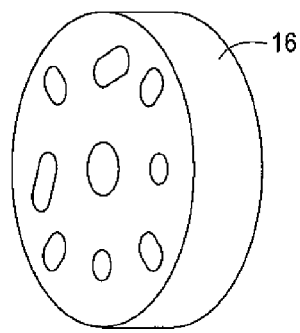
FIG. 4 is a perspective view of the embodiment of the universal attachment flange of the present invention illustrated in FIGS. 2 and 3.

The pattern of the holes 20 in the embodiment of FIGS. 2 to 4 include four elongated or oblong holes 22 spaced ninety degrees (90°) apart about the central threaded hole 18. Referring to FIG. 2, the hole 22a is located on a vertical centerline at the zero degree (0°) or three hundred sixty degree (360°) location, a hole 22b is located on a horizontal centerline at the ninety degree (90°) location, a hole 22c is located on the vertical centerline at the one hundred eighty degree (180°) location and a hole 22d is located on the horizontal centerline at the two hundred seventy degree (270°) location.

Each hole 22 is defined by radially inner semi-circular end surface formed by radius R struck from a point $P_1$ where the 5½ inch diameter bolt circle $BC_2$ intersects radial lines defining the horizontal and vertical centerlines of the universal attachment flange 16, and a radially outer semi-circular end surface formed by a radius R struck from a point $P_2$ where the 6 inch diameter bolt circle $BC_1$ intersects the horizontal and vertical centerlines. Parallel sidewall surfaces spaced apart a distance equal to twice radius R join the radially inner and radially outer semi-circular end surfaces to form elongated holes 22.

Two circular holes 30 are located adjacent, and on either side of hole 22b, one between holes 22a and 22b, and one between holes 22b and 22c. These holes are defined by radius R struck from a point $P_3$ where a line at and angle of forty five degrees (45°) to the horizontal centerline, on either side of it intersects the 4¾ inch bolt circle $BC_3$.

Two additional elongated or oblong holes 32 are provided adjacent, and on either side of hole 22d which is disposed one hundred eighty degrees (180°) from hole 22b. One such hole 32 is located between holes 22c and 22d and the other located between holes 22d and 22a. These holes are defined by an inner semi-circular end surface formed by radius R struck from a point $P_4$ where a radial line at forty-five degrees (45°) to the horizontal centerline, on either side of it intersects the 4¾ inch bolt circle $BC_3$ and a semi-circular surface formed by a radius R struck from a point $P_5$ where a radial line sixty degrees (60°) to the horizontal centerline, on either side of it intersects 5½ inch bolt circle $BC_2$. Parallel sidewall surfaces spaced apart a distance equal to twice radius R connect the semi-circular end surfaces to form elongated holes 32.

The holes 22, 30, and 32 in universal attachment flange 16 accommodate attachment to a variety of bolt patterns presented by different configurations of connection flange 13 found on different tank cars 10. In this embodiment, holes 22 accommodate or permit a bolted connection to a pattern on a connection flange 13 that includes four (4) holes equally spaced on a six inch (6") bolt circle or on a five and one-half inch (5½") bolt circle. Holes 30 and 32 accommodate a connection flange 13 that has four (4) bolt holes positioned equally spaced about a four and three quarter inch (4¾") bolt circle. Holes 32 and hole 22b accommodates or permit a bolted connection to a pattern of holes 15 on a connection 13 that is defined by three (3) holes equally spaced one hundred twenty degrees (120°) apart about a five and one half inch (5½") bolt circle.

Figure 5:
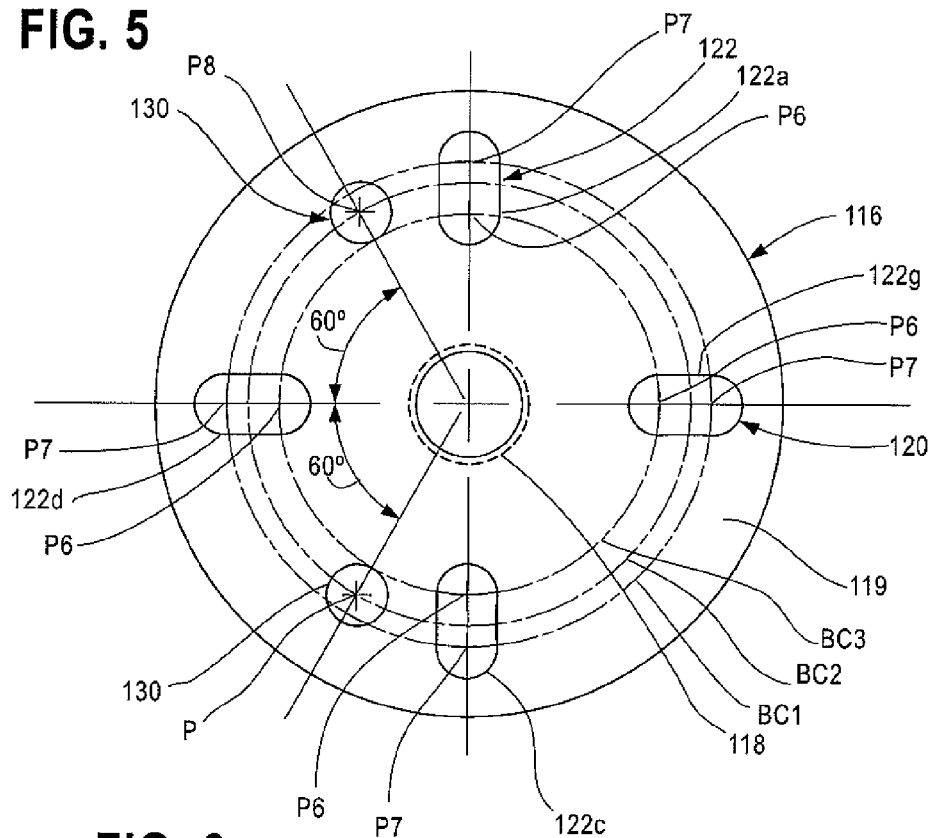
FIG. 5 is a front plan view of a modified form of a universal attachment flange embodying the present invention.
Figure 6:
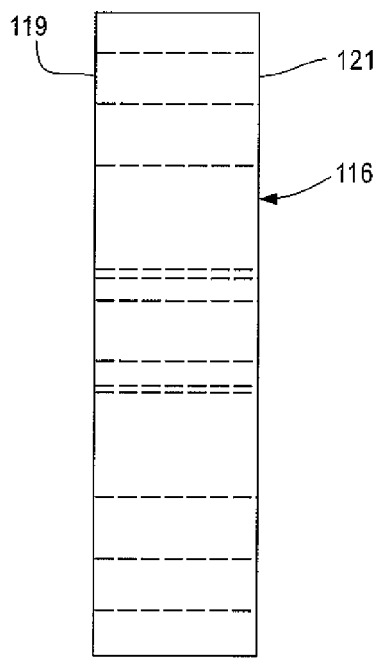
FIG. 6 is a side view of the flange of FIG. 5.
Figure 7:
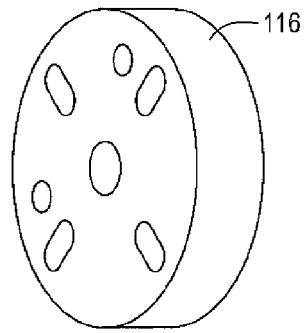
FIG. 7 is a perspective view of the embodiment of the universal attachment flange illustrated in FIGS. 5 and 6.

Turning now to FIGS. 5 through 7, there is illustrated a modified form of universal attachment flange designated 116 embodying the principles of the present invention.

As in the first embodiment, a universal attachment flange 116 accommodates variations in hole spacing arrangements of connection flange 13. The flange 116 is generally annular and includes a front generally planar face 119 and a rear generally planar face 121. The shape of the exterior perimeter or its axial thickness is not material to the present invention. It must only be of a shape and thickness to permit securement to the connection 13 on the tank car without leakage between facing surfaces. Again, a gasket is usually employed between the generally planar face 14 of connection flange 13 and rear facing surface 121 of universal attachment flange 116.

As illustrated in FIGS. 5 through 7, the universal attachment flange 116 includes a central hole 118 threaded with a pipe thread that commences at front generally planar facing surface 119. If the universal attachment flange 116 were employed as a cover or closure plate for opening 11, central hole 118 would be eliminated.

Threaded hole 118 receives a connection fitting of a hose from a supply of pressurized air. The hose connection illustrated is a one inch (1") national pipe thread (NPT) fitting, but the size can vary without departing from the present invention.

Rear generally planar face 121 mates with the planar face 14 of connection flange 13 in face-to-face relation. Flange 116 includes a series of through holes in a pattern, generally designated 120, through which bolts (not shown) can be passed. Nuts (not shown) attached to the bolts secure the flange 116 to the connection flange 13. A gasket (not shown) may be employed between the generally planar face 14 of connection 13 and rear generally planar face 121 of universal attachment flange 116 to insure against leakage.

The hole pattern 120 is a combination of elongated or oblong holes 122 and circular holes 130 that align with and overlie a variety of patterns on the connection flange 13 of different tank cars or tank trailers to permit attachment of the air supply to station 12. As described below, the hole patterns are formed by a radius designated "R" struck from locations on three concentric bolt circles designated $BC_1$, $BC_2$, and $BC_3$. The radial outer bolt circle $BC_1$ has a six inch (6") diameter, the middle bolt circle $BC_2$ has a five and one half inch (5½") diameter and radially inner bolt circle BC₃ has a four and three quarter inch (4¾") diameter.

The radius R defining the holes is a three-eights inch (⅜") radius. Thus, the round holes are three quarter inch (¾") in diameter (twice R) and the oblong or elongated holes have a width of three quarter inch (¾") and have semi-circular ends formed by a three-eights inch (⅜") radius (R). This hole size provides adequate clearance for the ⅝" bolts used to connect universal attachment flange 116 to connection flange 13.

The pattern of the holes 120 in the embodiment of FIGS. 5 to 7 include four elongated or oblong holes 122 spaced ninety degrees (90°) apart about the central threaded hole 118. Referring to FIG. 5, the hole 122a is located on a vertical centerline at the zero degree (0°) or three hundred sixty degree (360°) location, a hole 122b is located on a horizontal centerline at the ninety degree (90°) location, a hole 122c is located on the vertical centerline at the one hundred eighty degree (180°) location and a hole 22d is located on the horizontal centerline at the two hundred seventy degree (270°) location.

Each hole 122 is defined by radially inner semi-circular end surface formed by radius R struck from a point P₆ where the 4¾ inch diameter bolt circle BC₃ intersects the horizontal and vertical centerlines, and a radially outer semi-circular end surface formed by radius R struck from a point P₇ where the 6 inch diameter bolt circle BC₁ intersects the horizontal and vertical centerlines. Parallel sidewall surfaces spaced apart a distance equal to twice R join the radially inner and radially outer semi-circular end surfaces to form elongated holes 122.

Two circular holes 130 are located adjacent and on either side of hole 122d, one between holes 122c and 122d and one between holes 122d and 122a. These holes are defined by radius R struck from a point Pg where a line sixty degrees (60°) to the horizontal centerline, on either side of it intersects the 5½ inch bolt circle BC₂.

The holes 122 and 130 in universal attachment flange 116 accommodate attachment to a variety of bolt patterns presented by different connections 13 found on different configurations of connection flange 13 found on different tank cars 10. In this embodiment, holes 122 accommodate or permit a bolted connection to a pattern on a connection flange 13 that includes four (4) holes equally spaced on a six inch (6") bolt circle, on a five and one-half inch (5½") bolt circle or on a four and three-quarter inch (4¾") bolt circle. Holes 130 and hole 122b accommodate or permit a bolted connection to a pattern of holes 15 on a connection flange 13 that is defined by three holes equally spaced about a five and one-half inch (5½") bolt circle.

Various features of the present invention have been described with reference to the above illustrative embodiments. It should be understood that modifications may be made without departing from the spirit and scope of the invention as represented by the following claims.

I claim:

1. A universal attachment flange adapted to connect to an attachment flange receiving connection, said universal attachment flange comprising:
  a body defining a pair of spaced apart faces, one of said faces adapted to be secured to the attachment flange receiving connection in face-to-face relation,
  a pattern of through holes extending completely through said body between said faces,
  said pattern comprising a combination of through holes configured to align with a plurality of different hole patterns presented by various attachment flange receiving connections wherein said pattern on said body is configured to align with and permit passage therethrough of bolts inserted into bolt holes presented by hole patterns located on any one of three bolt circles, a radially outer bolt circle, a middle bolt circle and a radially inner bolt circle, and wherein said pattern on said body is configured to align with sets of four (4) bolt holes in an attachment flange receiving connection which are located ninety degrees (90°) apart on any one of said bolt circles, and wherein said hole pattern on said body includes oblong holes having semi-circular end surfaces defined by a radius R, wherein the dimension twice R is greater than the diameter of the bolts used to secure the universal attachment flange to an attachment flange receiving connection.

2. A universal attachment flange as claimed in claim 1 wherein said hole pattern additionally includes round holes defined by said radius R.

3. A universal attachment flange as claimed in claim 1 wherein said pattern on said body is defined by holes formed on an outer bolt circle BC₁, a middle bolt circle BC₂, and an inner bolt circle BC₃ and wherein said bolt circles are concentric and coaxial with a centerline perpendicular to said faces includes four elongated holes, each having a radially inner semi-circular end surface defined by said radius R struck from a point P₁, where four radial lines, disposed ninety degrees (90°) apart, intersect middle bolt circle BC₂ and a radially outer semi-circular end surface fanned by said radius R struck from a point P₂ where each of said four radial lines, ninety degrees (90°) apart, intersect outer bolt circle BC₁ said oblong holes having parallel side wall surfaces connecting said semi-circular end surfaces.

4. A universal attachment flange as claimed in claim 3, wherein said pattern on said body includes two additional oblong holes adjacent and on either side of one of said four oblong holes, said two additional oblong holes each having a radially outer semi-circular end surface defined by said radius R struck from a point P₅ where a radial line sixty degrees (60°) on either side of said one of said radial lines passing through said one of said four oblong holes intersects said middle bolt circle BC₂, said two additional holes further including an inner semi-circular end surface defined by said radius R struck from a point P₄ on said inner bolt circle BC₃ where a radial line forty-five degrees (45°) on either side of said one of said radial lines passing through said one of said four oblong holes intersects said inner bolt circle BC₃, said two additional oblong holes having parallel sidewall surfaces connecting said semi-circular end surfaces.

5. A universal attachment flange as claimed in claim 4 wherein said pattern on said body further includes two round holes defined by said radius R struck from a point P₃ where inner bolt circle BC₃ intersects a line forty-five degrees (45°) on either side of a radial line passing though the one of said four oblong holes.

6. A universal attachment flange as claimed in claim 1, wherein said pattern is defined by holes on an outer bolt circle BC₁ a middle bolt circle BC₂, and an inner bolt circle BC₃ wherein said bolt circles are concentric and coaxial with a centerline perpendicular to said faces and includes four elongated holes having radially inner semi-circular end surfaces formed by radius R struck from a point P₆ where the inner bolt circle BC₃ intersects each of four radial lines ninety degrees (90°) apart and a radially outer semi-circular end surface defined by radius R struck from a point P₇ where each of said four radial lines intersects said outer bolt circle BC₁, said oblong holes having parallel side wall surfaces connecting said semi-circular end surfaces.

7. A universal attachment flange as claimed in claim 6 wherein said pattern further includes two round holes defined by radius R struck from a point $P_7$ where said middle bolt circle $BC_2$ intersects a radial line sixty degrees on either side of one of said radial lines passing through one of said four oblong holes.

8. A universal attachment flange as claimed in claim 1 wherein said flange further includes a through hole to receive a connection fitting.

9. A universal attachment flange as claimed in claim 2 wherein said flange further includes a through hole to receive a connection fitting.

10. A universal attachment flange as claimed in claim 3 wherein said flange further includes a through hole to receive a connection fitting.

11. A universal attachment flange as claimed in claim 4 wherein said flange further includes a through hole to receive a connection fitting.

12. A universal attachment flange as claimed in claim 5 wherein said flange further includes a through hole to receive a connection fitting.

13. A universal attachment flange as claimed in claim 6 wherein said flange further includes a through hole to receive a connection fitting.

14. A universal attachment flange as claimed in claim 7 wherein said flange further includes a through hole to receive a connection fitting.

* * * * *

UNITED STATES PATENT AND TRADEMARK OFFICE
CERTIFICATE OF CORRECTION

PATENT NO. : 7,644,962 B2  Page 1 of 1
APPLICATION NO. : 11/361777
DATED : January 12, 2010
INVENTOR(S) : Andrew Christian Crouse It is certified that error appears in the above-identified patent and that said Letters Patent is hereby corrected as shown below:

Column 6, Claim 2:
Line 15, after "pattern" insert the phrase -- on said body --

Column 6, Claim 3:
Line 26, change "fanned" to -- formed --

Signed and Sealed this

Twenty-third Day of March, 2010

David J. Kappos
*Director of the United States Patent and Trademark Office*